United States Patent
Morita

(10) Patent No.: US 12,063,435 B2
(45) Date of Patent: Aug. 13, 2024

(54) IMAGE CAPTURING APPARATUS, CONTROL METHOD, AND STORAGE MEDIUM

(71) Applicant: CANON KABUSHIKI KAISHA, Tokyo (JP)

(72) Inventor: Hiroyasu Morita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 18/045,902

(22) Filed: Oct. 12, 2022

(65) Prior Publication Data
US 2023/0164432 A1   May 25, 2023

(30) Foreign Application Priority Data

Nov. 25, 2021   (JP) .................................. 2021-191439

(51) Int. Cl.
*H04N 23/661*   (2023.01)
*B64C 39/02*    (2023.01)
*H04N 23/695*   (2023.01)
*B64U 101/30*   (2023.01)

(52) U.S. Cl.
CPC ......... *H04N 23/661* (2023.01); *B64C 39/024* (2013.01); *H04N 23/695* (2023.01); *B64U 2101/30* (2023.01); *B64U 2201/20* (2023.01)

(58) Field of Classification Search
None
See application file for complete search history.

(56) References Cited

U.S. PATENT DOCUMENTS

| | | | |
|---|---|---|---|
| 9,692,956 B2 | 6/2017 | Sato | |
| 11,023,750 B2 | 6/2021 | Yamada | |
| 11,310,416 B2 | 4/2022 | Morita | |
| 2019/0012332 A1* | 1/2019 | Newman | H04N 1/2158 |
| 2020/0137295 A1* | 4/2020 | Zhong | H04N 23/695 |

FOREIGN PATENT DOCUMENTS

| | | |
|---|---|---|
| JP | 2010-278962 A | 12/2010 |
| JP | 2016-220004 A | 12/2016 |
| JP | 2017-85437 A  | 5/2017 |

* cited by examiner

*Primary Examiner* — Heather R Jones
(74) *Attorney, Agent, or Firm* — VENABLE LLP

(57) ABSTRACT

There is provided an image capturing apparatus. An image capturing unit captures an image at an image capturing frequency that depends on a transmission setting. In a case where the transmission setting is a first setting, the image capturing frequency is higher than in a case where the transmission setting is a second setting or a third setting. A generation unit generates additional information associated with a captured image obtained by capturing an image at the image capturing frequency in the case where the transmission setting is the first setting or the third setting. The additional information is for use in control processing for a control device to control at least one of position and attitude of the image capturing apparatus.

13 Claims, 6 Drawing Sheets

IMAGE CAPTURING APPARATUS, CONTROL METHOD, AND STORAGE MEDIUM

BACKGROUND OF THE INVENTION

Field of the Invention

The present invention relates to an image capturing apparatus, a control method and a storage medium.

Description of the Related Art

Japanese Patent Laid-Open No. 2016-220004 describes a method of executing flight control of a drone, using image data generated by an image capturing apparatus that is mounted to the drone and operates in cooperation with the drone. Japanese Patent Laid-Open No. 2017-85437 describes a method of utilizing live view images and supplementary information from a camera.

In the case where a moving apparatus such as a drone controls the position and the like (at least one of position and attitude) of an image capturing apparatus based on additional information, control accuracy decreases depending on the update frequency of the additional information, possibly making it difficult to get the image capturing apparatus to track the movement of the subject. For example, if the subject moves away from the center of the angle of view, there is a possibility that, unless the moving apparatus can quickly acquire additional information in which the position of the subject after moving is reflected, it will not be able to control the image capturing apparatus to return the subject to the center of the angle of view. Such problems cannot be resolved with the method described in Japanese Patent Laid-Open No. 2016-220004 or Japanese Patent Laid-Open No. 2017-85437.

SUMMARY OF THE INVENTION

In view of this, the present invention makes it possible to improve the accuracy of control of the position and the like of an image capturing apparatus.

According to a first aspect of the present invention, there is provided an image capturing apparatus comprising at least one processor and/or at least one circuit which functions as: an image capturing unit configured to capture an image at an image capturing frequency that depends on a transmission setting, wherein in a case where the transmission setting is a first setting, the image capturing frequency is higher than in a case where the transmission setting is a second setting or a third setting; a generation unit configured to generate additional information associated with a captured image obtained by capturing an image at the image capturing frequency in the case where the transmission setting is the first setting or the third setting, the additional information being for use in control processing for a control device to control at least one of position and attitude of the image capturing apparatus; and a transmission unit configured to transmit the additional information to the control device in the case where the transmission setting is the first setting, to transmit the captured image to the control device in the case where the transmission setting is the second setting, and to transmit the additional information and the captured image to the control device in the case where the transmission setting is the third setting.

According to a second aspect of the present invention, there is provided a control method for an image capturing apparatus, comprising: capturing an image at an image capturing frequency that depends on a transmission setting, wherein in a case where the transmission setting is a first setting, the image capturing frequency is higher than in a case where the transmission setting is a second setting or a third setting; generating additional information associated with a captured image obtained by capturing an image at the image capturing frequency in the case where the transmission setting is the first setting or the third setting, the additional information being for use in control processing for a control device to control at least one of position and attitude of the image capturing apparatus; and transmitting the additional information to the control device in the case where the transmission setting is the first setting, transmitting the captured image to the control device in the case where the transmission setting is the second setting, and transmitting the additional information and the captured image to the control device in the case where the transmission setting is the third setting.

According to a third aspect of the present invention, there is provided a non-transitory computer-readable storage medium which stores a program for causing a computer to execute a control method comprising: capturing an image at an image capturing frequency that depends on a transmission setting, wherein in a case where the transmission setting is a first setting, the image capturing frequency is higher than in a case where the transmission setting is a second setting or a third setting; generating additional information associated with a captured image obtained by capturing an image at the image capturing frequency in the case where the transmission setting is the first setting or the third setting, the additional information being for use in control processing for a control device to control at least one of position and attitude of the image capturing apparatus; and transmitting the additional information to the control device in the case where the transmission setting is the first setting, transmitting the captured image to the control device in the case where the transmission setting is the second setting, and transmitting the additional information and the captured image to the control device in the case where the transmission setting is the third setting.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The present invention is, however, not limited to the following embodiments.

First Embodiment

Figure 1:
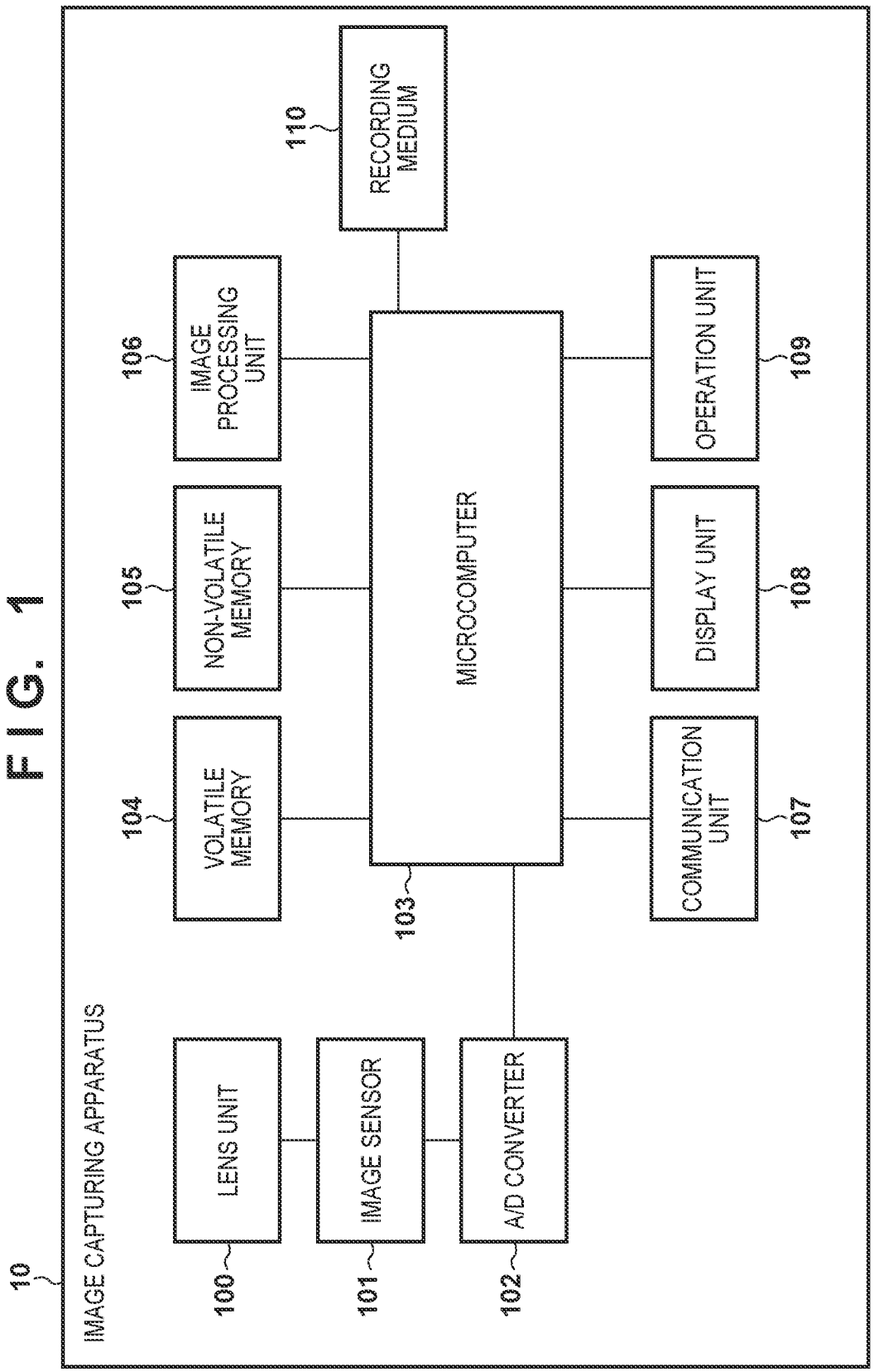
FIG. 1 is a block diagram for describing constituent elements of an image capturing apparatus 10 in first to third embodiments.

FIG. 1 is a block diagram for describing constituent elements of an image capturing apparatus 10 in the first embodiment. The image capturing apparatus 10 is, for example, a device capable of operating as a digital camera.

As shown in FIG. 1, the image capturing apparatus 10 has a lens unit 100, an image sensor 101, an A/D converter 102, a microcomputer 103, a volatile memory 104 and a non-volatile memory 105. The image capturing apparatus 10 further has an image processing unit 106, a communication unit 107, a display unit 108, an operation unit 109 and a recording medium 110. These constituent elements of the image capturing apparatus 10 each have a circuit for realizing functions described later. Note that the constituent elements of the image capturing apparatus 10 are not limited to the constituent elements shown in FIG. 1.

The lens unit 100 is a single focal length lens unit or a zoom lens unit. The microcomputer 103 is able to acquire information such as focal length, current zoom position and lens barrel length from the lens unit 100. Also, in the case where zoom drive of the lens unit 100 is instructed by the microcomputer 103 or the like, it is possible for the lens unit 100 to move the zoom position.

The image sensor 101 is a CCD image sensor or a CMOS image sensor. The image sensor 101 converts subject images formed by the lens unit 100 into electrical signals. The A/D converter 102 converts analog output signals of the image sensor 101 into digital signals.

The microcomputer 103 controls the constituent elements of the image capturing apparatus 10. Also, the microcomputer 103 performs control that depends on operation instructions from the operation unit 109, generation of images to be displayed on the display unit 108, network control via the communication unit 107, and the like. Also, the microcomputer 103 performs communication processing for when operating in cooperation with a moving apparatus 20 described later, control for receiving the status of the moving apparatus 20, processing for controlling the moving apparatus 20, and the like. The microcomputer 103 also performs control for communicating with the lens unit 100. The microcomputer 103 also performs determination of whether the lens unit 100 is connected, acquisition of zoom position, acquisition of shortest image capturing distance, and control (zoom control, etc.) relating to the lens unit 100. The microcomputer 103 also generates additional information that supplements live view images generated by the image processing unit 106 described later. Additional information includes, for example, information obtained from a level included in the image capturing apparatus 10, information (AF frame information) indicating the position and size of an AF frame indicating the position of a subject focused with autofocus (AF), and information indicating whether the subject is in focus.

The volatile memory 104 is a storage medium that stores image data converted into digital signals by the A/D converter 102. The non-volatile memory 105 is a storage medium storing a computer program that the microcomputer 103 executes in order to control each of the constituent elements of the image capturing apparatus 10. Setting values of the image capturing apparatus 10 are also stored in the non-volatile memory 105. The image processing unit 106 performs image processing on images that have been captured (captured images). The image processing unit 106 also performs generation of live view images for checking composition, focus and the like at the time of image capture, in coordination with the microcomputer 103.

The communication unit 107 performs communication by a communication method such as wireless LAN, for example. Note that the communication method that is used by the communication unit 107 may be a wired communication method or a wireless communication method. The microcomputer 103 operates in cooperation with the moving apparatus 20 or a gimbal 118 described later, by communicating with the moving apparatus 20 or the gimbal 118 via the communication unit 107. As the cooperation method, a cooperation method such as a dedicated software development kit (SDK) may be used, or an API publication method such as HTTP based Web APIs may be used. Alternatively, a cooperation method that is public in the image capturing apparatus 10, the moving apparatus 20 or the gimbal 118 may be used, or a cooperation method that is public in each of these devices may be used. In the first embodiment, the cooperation method is not particularly limited.

The display unit 108 displays menus, playback images and the like, under the control of the microcomputer 103. The display unit 108 also displays live view images. The operation unit 109 includes, for example, a plurality of operation members (buttons or keys) or a touch panel. In the case where a touch panel of the operation unit 109 is provided on the display unit 108, a user is able to perform operations on the contents displayed on the display unit 108. The recording medium 110 is, for example, a memory card. The microcomputer 103 is able to write data on the volatile memory 104 to the recording medium 110. Also, the microcomputer 103 is able to read out data that is saved on the recording medium 110 to the volatile memory 104.

Figure 2:
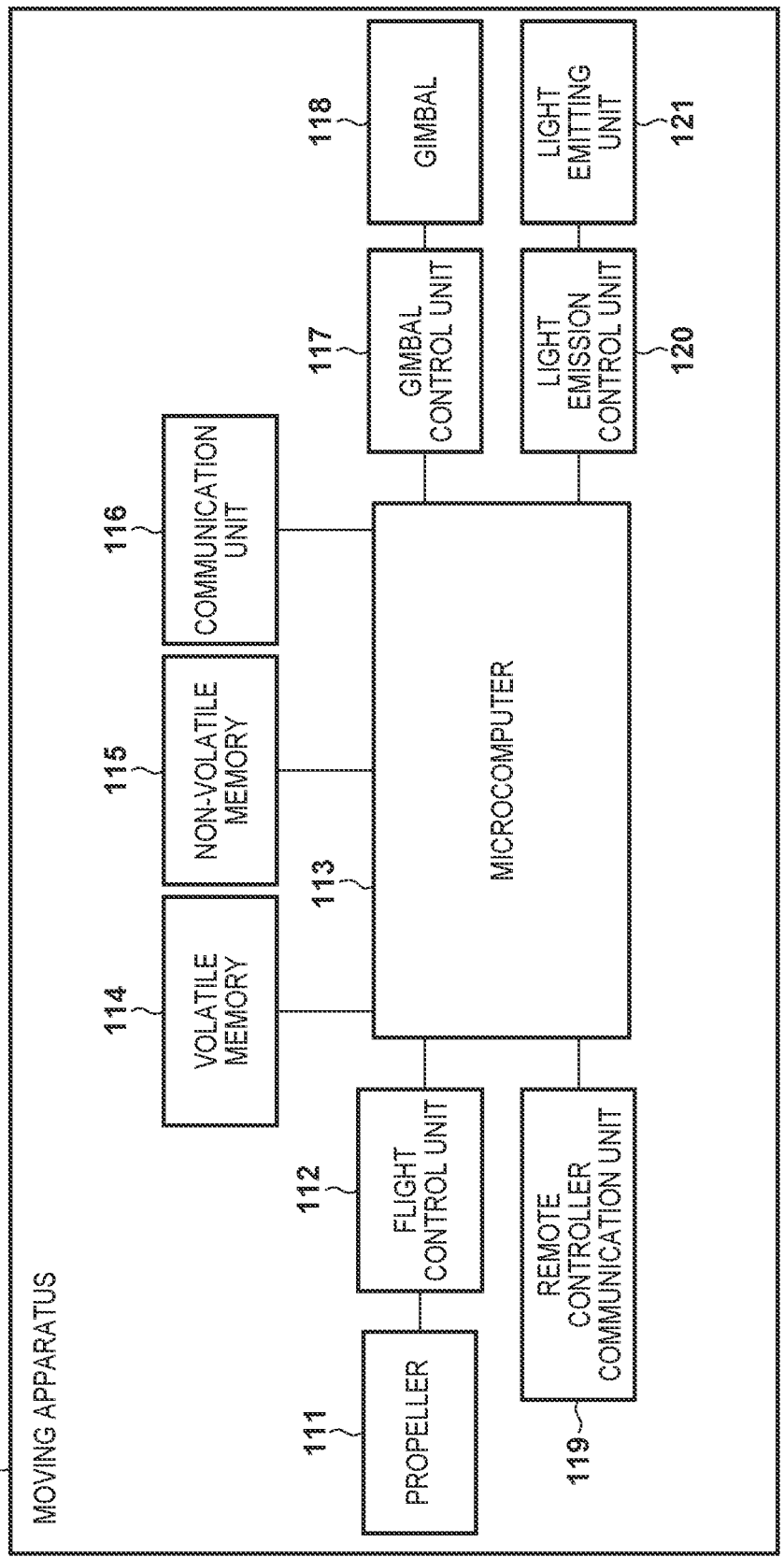
FIG. 2 is a block diagram for describing constituent elements of a moving apparatus 20 in the first to third embodiments.

FIG. 2 is a block diagram for describing constituent elements of the moving apparatus 20 in the first embodiment. The moving apparatus 20 is, for example, a device capable of operating as a drone.

As shown in FIG. 2, the moving apparatus 20 has a propeller 111, a flight control unit 112, a microcomputer 113, a volatile memory 114, a non-volatile memory 115, and a communication unit 116. The moving apparatus 20 further has a gimbal control unit 117, the gimbal 118, a remote controller communication unit 119, a light emission control unit 120, and a light emitting unit 121. These constituent elements included in the moving apparatus 20 each have a circuit for realizing functions described later. Note that the constituent elements of the moving apparatus 20 are not limited to the constituent elements shown in FIG. 2.

The propeller 111 is a propeller for moving the moving apparatus 20 up, down, forward, backward, right or left. The flight control unit 112 performs flight control of the moving apparatus 20 in cooperation with the microcomputer 113. The flight control unit 112 performs processing for controlling the flight speed, control for acquiring the length and height of the propeller, and the like. The flight control unit 112 also performs control such that the moving apparatus 20 does not collide with objects such as the subject. Any existing technique can be utilized as the collision avoidance algorithm of the moving apparatus 20.

The microcomputer 113 controls each of the constituent elements of the moving apparatus 20. The volatile memory 114 is a storage medium that stores various information or various data that is utilized in the microcomputer 113. The non-volatile memory 115 is a storage medium storing a computer program that the microcomputer 113 executes in order to control each of the constituent elements of the moving apparatus 20.

The communication unit 116 is able to communicate with the communication unit 107 of the image capturing apparatus 10. Cooperation between the image capturing apparatus 10 and the moving apparatus 20 is realized, by the communication unit 116 communicating with the communication unit 107 of the image capturing apparatus 10. The communication method of the communication unit 116 is not particularly limited. The communication method that is used by the communication unit 116 may be a wired communication method or a wireless communication method. Examples of information that is communicated include control commands for controlling the moving apparatus 20, notifications relating to the status of the moving apparatus 20, control commands for controlling the image capturing apparatus 10, information relating to the lens unit 100 that is mounted to the image capturing apparatus 10, and the like.

The gimbal 118 is removable from the moving apparatus 20. The gimbal control unit 117 is a control unit that controls the gimbal 118 mounted to the moving apparatus 20. The image capturing apparatus 10 is mountable to the gimbal 118 and is installed in the moving apparatus 20 via the gimbal 118. The gimbal control unit 117 is able to adjust the angle and the like of the image capturing apparatus 10 that is mounted to the gimbal 118, in cooperation with the microcomputer 113. The remote controller communication unit 119 is capable of communicating with a remote controller that is operated by a user. The moving apparatus 20 may be configured to be remotely controlled by a user who operates a remote controller or the like. Also, the moving apparatus 20 may be an autonomous flight drone capable of flying in a state where a flight path or the like is set in advance. In the case where the moving apparatus 20 is controlled via a remote controller or the like, the microcomputer 113 receives control commands via the remote controller communication unit 119 and controls the moving apparatus 20 in accordance with the received control commands.

The light emission control unit 120 is a control unit for controlling the light emission state of the light emitting unit 121. The light emitting unit 121 includes a light emitting element (e.g., LED). In consideration of night flight and the like, the moving apparatus 20 has the light emitting unit 121, in order to allow the user to see where the moving apparatus 20 is flying. The light emission control unit 120 controls the light emission state of the light emitting unit 121.

Figure 3:
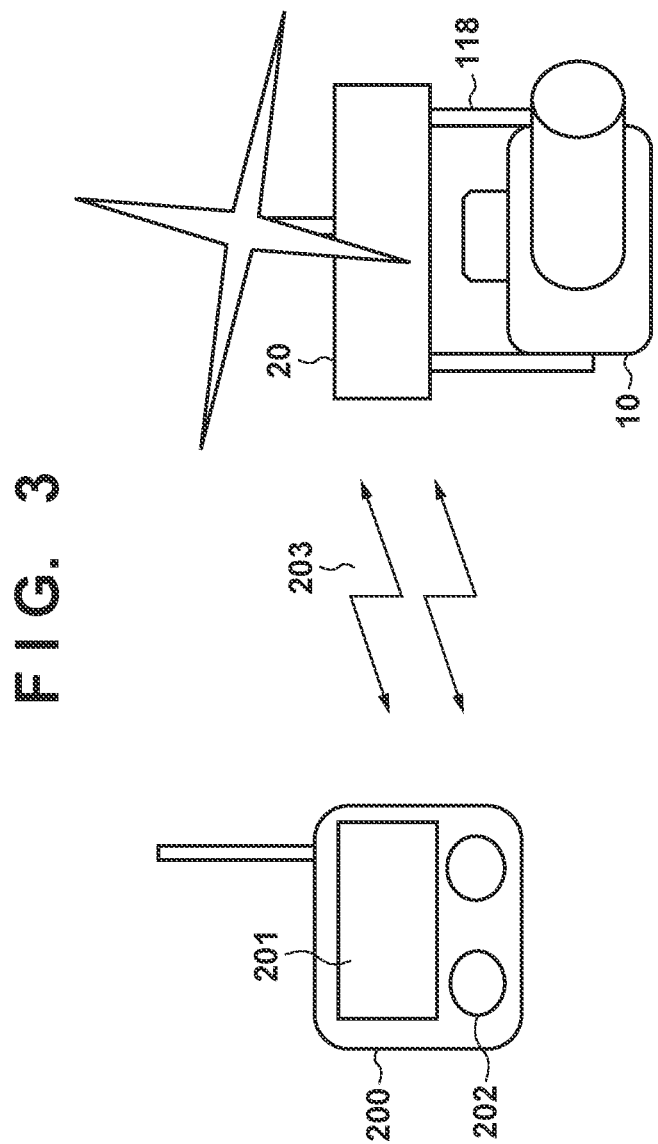
FIG. 3 is a diagram for describing an example configuration of an image capturing system in the first to third embodiments.

FIG. 3 is a diagram for describing an example configuration of the image capturing system in the first embodiment. Reference numeral 200 denotes a remote controller for remotely controlling the moving apparatus 20. The remote controller 200 is operated by the user, and it is possible to control the moving apparatus 20 based on instructions thereof. Reference numeral 201 denotes a display unit of the remote controller 200. The remote controller 200 displays image data captured by the image capturing apparatus 10 that is mounted to the moving apparatus 20 on the display unit 201. The user is thereby able to check the angle of view of still images or moving images, and so on. In the case where some sort of error or the like occurs when the image capturing apparatus 10 and the moving apparatus 20 cooperate to provide a function, the remote controller 200 is able to display an error message on the display unit 201.

Reference numeral 202 denotes an operation unit of the remote controller 200. By operating the operation unit 202, the user is able to instruct the moving apparatus 20 to take off, land, fly forward, rotate and the like. The user is also able to control the image capturing apparatus 10 via the moving apparatus 20. Also, by operating the operation unit 202, the user is able to instruct control of the lens unit 100 that is mounted to the image capturing apparatus 10, for example.

Reference numeral 203 conceptually denotes communication that is performed between the remote controller 200 and the remote controller communication unit 119 of the moving apparatus 20. Remote control radio waves for controlling the moving apparatus 20 are, for example, proportional control radio waves. Since it is possible for the moving apparatus 20 to fly at an altitude of several hundred meters, it is envisaged that, essentially, long distance wireless or wired communication will be performed. The method of communication between the remote controller 200 and the moving apparatus 20 is not particularly limited. The image capturing apparatus 10 is supported by the gimbal 118 of the moving apparatus 20 and mounted to the moving apparatus 20.

In the image capturing system of the first embodiment, the position or attitude of the image capturing apparatus 10 also changes, according to a change in position or attitude of the moving apparatus 20. Also, the moving apparatus 20 is able to change the position or attitude of the image capturing apparatus 10, by driving the gimbal 118. Accordingly, the moving apparatus 20 serves as a control device for controlling the position and the like (at least one of position and attitude) of the image capturing apparatus 10.

The image capturing apparatus 10 generates additional information associated with the live view images. The additional information includes a first type of information that is used for control processing for the moving apparatus 20 to control the position and the like of the image capturing apparatus 10. Examples of the first type of information include information (AF frame information) indicating the size and position of a frame (AF frame) indicating the position of the subject that is the autofocus target. Another example of the first type of information is information indicating whether the subject is in focus. In the case where the additional information includes AF frame information, the moving apparatus 20 is able to control the position and the like of the image capturing apparatus 10 such that the subject is in the center of the angle of view, for example, based on the position indicated by the AF frame information. The additional information may include, as the first type of information, at least one of AF frame information and information indicating whether the subject is in focus. Note that the moving apparatus 20 may transmit additional information including AF frame information to the remote controller 200 together with the live view images. In this case, the remote controller 200 is able to display the AF frame information in a superimposed manner on the live view images on the display unit 201, and is thereby able to improve operability for the user.

The additional information may also include a second type of information that is not used in control processing for controlling the position and the like of the image capturing apparatus 10. An example of the second type of information is information of the level. Functions of the image capturing apparatus 10 include a function of displaying information of the level representing the inclination of the image capturing apparatus 10 in a superimposed manner on the live view images that are displayed on the display unit 108. The user is thereby able to comprehend the tilt of the image capturing apparatus 10. The information of the level can also be utilized when the image capturing apparatus 10 and the moving apparatus 20 cooperate. For example, when displaying live view images of the image capturing apparatus 10 on the display unit 201 of the remote controller 200 that controls the moving apparatus 20, the remote controller 200 is able to display the information of the level included in the additional information in a superimposed manner on the live view images. It thereby becomes possible for the user to confirm the inclination of the image capturing apparatus 10, even during flight of the moving apparatus 20. In this way, the additional information may include information that improves operability for the user, even though such information is not used for control of the position and the like of the image capturing apparatus 10 by the moving apparatus 20.

The moving apparatus 20 is able to acquire one or both of live view images and additional information from the image capturing apparatus 10. The moving apparatus 20 is able to use HTTP based control commands (acquisition commands) of a format such as described below, for example, in order to acquire one or both of live view images and additional information from the image capturing apparatus 10.

Example of the Format of an Acquisition Command:
GET http://[IPAddress]:[Port]/ccapi/[Version]/shooting/liveview/flipdetail[?kind]

In the above format, "kind" indicates the type of data that is requested as described below.
image: Live view images (default value in the case where "kind" is omitted)
info: Additional Information
both: Live view images and additional information Example of an Acquisition Command:
GET http://192.168.1.2:8080/ccapi/ver100/shooting/liveview/flipdetail?kind=both Apart from the above acquisition command, the moving apparatus 20 is able to use control commands in order to instruct the image capturing apparatus 10 to capture images and to instruct zooming of the lens unit 100 that is mounted to the image capturing apparatus 10. The image capturing apparatus 10 is configured to receive control commands transmitted by the moving apparatus 20. Also, the moving apparatus 20 is similarly configured to receive control commands for controlling the moving apparatus 20. In the case where it is desired to control the moving apparatus 20 from the image capturing apparatus 10, the image capturing apparatus 10 communicates with the communication unit 116 of the moving apparatus 20 and transmits control commands to the moving apparatus 20, via the communication unit 107. The microcomputer 113 of the moving apparatus 20 interprets the control commands received from the image capturing apparatus 10, and controls at least one of the moving apparatus 20 and the gimbal 118. Examples of control commands for controlling the moving apparatus 20 include a control command for increasing or decreasing the flight speed of the moving apparatus 20. Various types of control commands including acquisition commands are communicated via the communication unit 107 of the image capturing apparatus 10 and the communication unit 116 of the moving apparatus 20.

The image capturing apparatus 10 operates with a transmission setting that is determined according to the type of data that is requested by the acquisition command. With a setting (first setting) for when the data that is requested is additional information, the image capturing apparatus 10 repeatedly captures live view images at an image capturing frequency (frame rate) higher than the standard frequency, and generates additional information corresponding to each image. With a setting (second setting) for when the data that is requested is live view images, the image capturing apparatus 10 repeatedly captures live view images at the standard image capturing frequency (frame rate). With a setting (third setting) for when the data that is requested is live view images and additional information, the image capturing apparatus 10 repeatedly captures live view images at the standard image capturing frequency (frame rate) and generates additional information corresponding to each image. In the following description, as an example, the standard image capturing frequency (frame rate) is given as 30 fps, and the image capturing frequency (frame rate) higher than the standard frequency is given as 60 fps.

In this way, when the data that is requested is additional information, additional information associated with each image captured at a higher image capturing frequency than the standard frequency is generated and provided to the moving apparatus 20. Accordingly, the moving apparatus 20 is able to acquire additional information associated with the latest image at a high frequency, and it thus becomes possible to control the position and the like of the image capturing apparatus 10 with higher accuracy.

Note that the control device of the first embodiment is not limited to a flyable moving apparatus such as the moving apparatus 20. For example, in the case where the gimbal 118 is configured to be able to acquire additional information from the image capturing apparatus 10 and change its own attitude based on the additional information, it is possible for the gimbal 118 to serve as a control device. Alternatively, in the case where the moving apparatus 20 is a self-propelled vehicle that travels on land and does not fly, it is possible for the self-propelled vehicle to serve as a control device.

Figure 4:
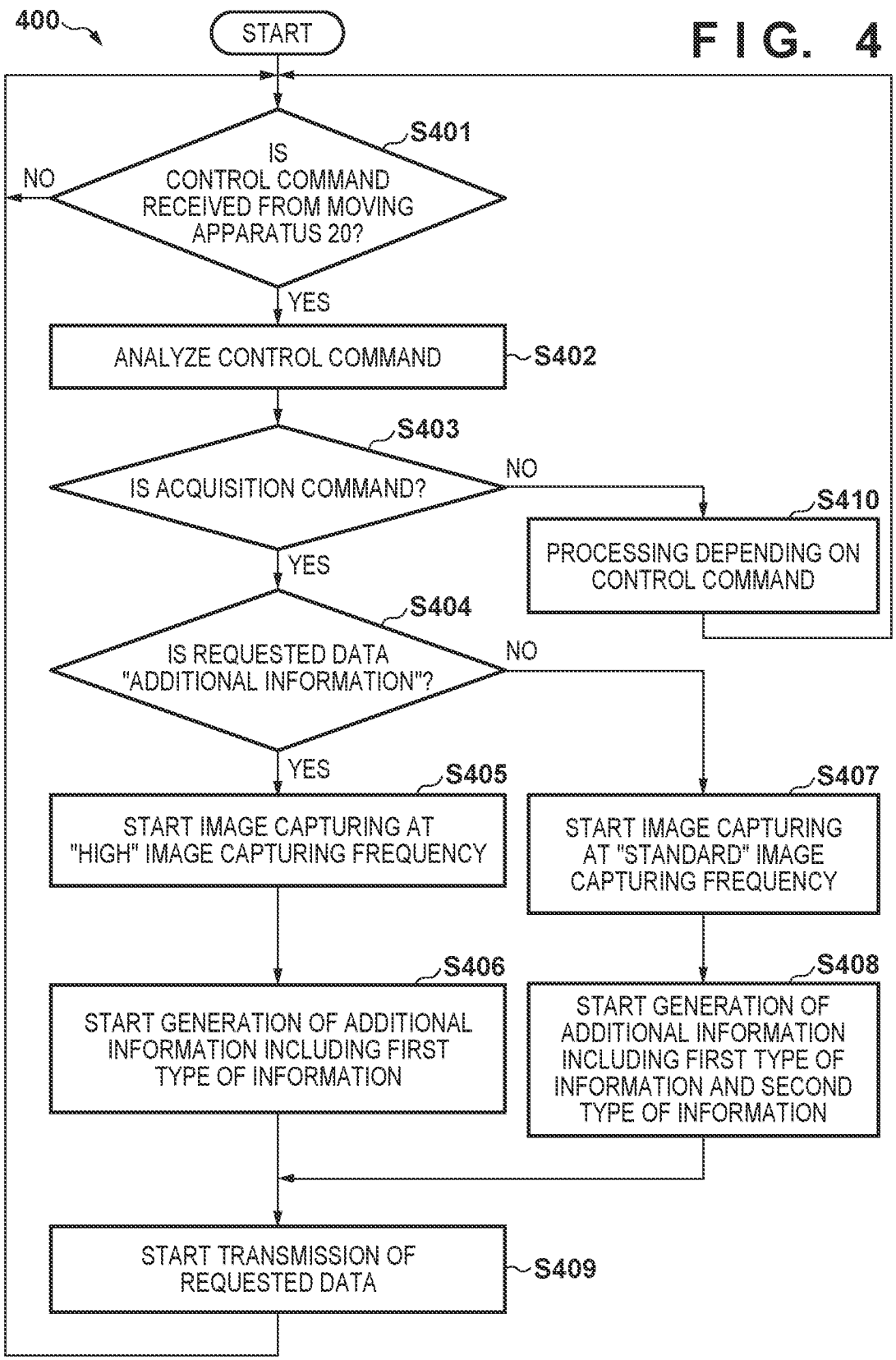
FIG. 4 is a flowchart for describing processing 400 that is performed by the image capturing apparatus 10 in the image capturing system of the first embodiment.

FIG. 4 is a flowchart for describing processing 400 that is performed by the image capturing apparatus 10 in the image capturing system of the first embodiment. The processing 400 starts when the image capturing apparatus 10 and the moving apparatus 20 are connected via the communication unit 107 and the communication unit 116.

In step S401, the microcomputer 103 determines whether a control command to the image capturing apparatus 10 has been received from the moving apparatus 20. The microcomputer 103 repeats the determination of step S401 until a control command is received. Upon receiving a control command, the processing 400 proceeds to step S402.

In step S402, the microcomputer 103 analyzes the received control command.

In step S403, the microcomputer 103 determines, based on the result of the analysis in step S402, whether the received control command is an acquisition command (control command for acquiring one or both of live view images and additional information from the image capturing apparatus 10). If the received control command is an acquisition command, the processing 400 proceeds to step S404, and, if this not the case, the processing 400 proceeds to step S410.

In step S404, the microcomputer 103 determines whether the data requested by the acquisition command is "additional information". In the case where the acquisition command format illustrated above is used, the microcomputer 103 is able to determine whether the data requested by the acquisition command is "additional information" based on the value of "kind". If the requested data is "additional information", the processing 400 proceeds to step S405, and, if this is not the case, (if the requested data is "live view image" or "live view image and additional information"), the processing 400 proceeds to step S407.

In step S405, the microcomputer 103 starts control for repeatedly capturing live view images at an image capturing frequency higher than the standard frequency.

In step S406, the microcomputer 103 starts generation of additional information including the first type of information (information used in control processing for the moving apparatus 20 to control the position, etc. of the image capturing apparatus 10). Additional information associated with each image that is obtained by repeatedly capturing live view images at a higher image capturing frequency than the standard frequency is thereby generated. Accordingly, in the case where the additional information includes AF frame information, for example, it becomes possible for the moving apparatus 20 to specify the position and size of the subject at a high frequency, and to control the position and the like of the image capturing apparatus 10 with higher accuracy. Also, because the additional information whose generation is started in step S406 does not include the second type of information (information not used in control processing for controlling the position, etc. of the image capturing apparatus 10), the size of the data that is transmitted from the image capturing apparatus 10 to the moving apparatus 20 is reduced.

In step S407, the microcomputer 103 starts control for repeatedly capturing live view images at the standard image capturing frequency. In step S408, the microcomputer 103 starts generation of additional information including the first type of information and the second type of information. Note that if the requested data is "live view image", the microcomputer 103 may omit generation of additional information.

In step S409, the microcomputer 103 starts control for transmitting data requested by the acquisition command to the moving apparatus 20. For example, if the requested data is "additional information", the microcomputer 103 starts control for transmitting the additional information generated as a result of step S406 to the moving apparatus 20. If the requested data is "live view image", the microcomputer 103 starts to control transmitting the live view images captured as a result of step S407 to the moving apparatus 20. If the requested data is "live view image and additional information", the microcomputer 103 starts control for transmitting the live view images captured as a result of step S407 and the additional information generated as a result of step S408 to the moving apparatus 20.

If the processing 400 proceeds from step S403 to step S410, the microcomputer 103 executes processing that depends on the received control command.

As described above, according to the first embodiment, in the case where the data that is requested by the moving apparatus 20 is "additional information", the image capturing apparatus 10 repeatedly captures live view images at an image capturing frequency higher than the standard frequency. The image capturing apparatus 10 then generates additional information associated with each captured image and transmits the generated additional information to the moving apparatus 20. Accordingly, with the first embodiment, the moving apparatus 20 is able to acquire additional information associated with the latest image at a high frequency, and it thus becomes possible to control the position and the like of the image capturing apparatus 10 with higher accuracy.

Note that, in the above description, the images obtained by the image capturing apparatus 10 repeatedly performing image capturing are live view images, but may be other types of images (e.g., frame images of a moving image for recording, etc.).

In the first embodiment, processing for increasing the image capturing frequency in step S405 and processing for switching the data to be generated according to the type of additional information in step S406 are described. In an embodiment, a sequence that implements both step S405 and step S406 may be created, as in the first embodiment, or only one of step S405 and step S406 may be employed, and a sequence adapted thereto may be created and implemented.

Note that, as an example of increasing the transmission frequency of additional information, a method of increasing the image capturing frequency as in step S405 is described, but a state is also envisaged in which the frequency for generating live view images differs from the processing frequency required in order to generate additional information, and the frequency for generating additional information is higher. In such a case, a configuration may be adopted in which processing such as for increasing the transmission frequency of additional information is performed, rather than processing for increasing the image capturing frequency.

Second Embodiment

A second embodiment will be described, with reference to FIG. 5. In the second embodiment, the basic configurations of the image capturing apparatus 10 and the moving apparatus 20 are similar to the first embodiment. The following description will focus on the differences from the first embodiment.

Figure 5:
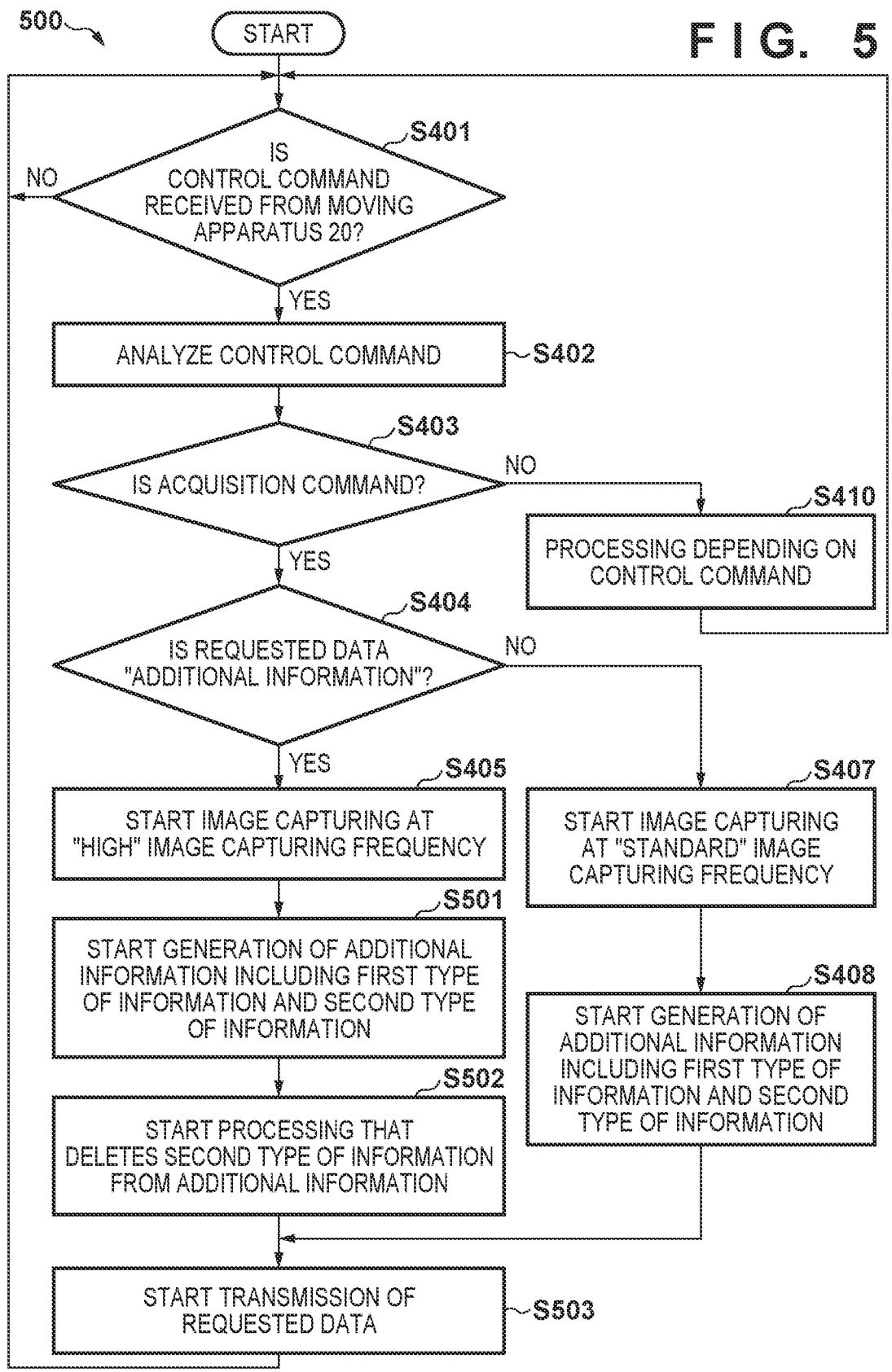
FIG. 5 is a flowchart for describing processing 500 that is performed by the image capturing apparatus 10 in the image capturing system of the second embodiment.

FIG. 5 is a flowchart for describing processing 500 that is performed by the image capturing apparatus 10 in the image capturing system of the second embodiment. As can be seen from FIG. 5, the processing 500 differs from the processing 400 in that steps S406 and S409 are respectively replaced by steps S501 and S503, and step S502 is added following step S501. The processing 500 starts when the image capturing apparatus 10 and the moving apparatus 20 are connected via the communication unit 107 and the communication unit 116.

In step S501, the microcomputer 103 starts generation of additional information including the first type of information and the second type of information. In step S502, the microcomputer 103 starts processing for deleting the second type of information from each piece of the generated additional information.

Following step S502 or S408, the microcomputer 103, in step S503, starts control for transmitting the data requested by the acquisition command to the moving apparatus 20. Step S503 of the processing 500 is similar to step S409 of the processing 400, although in the case where the requested data is "additional information", additional information from which the second type of information has been deleted by the processing described in step S502 is used as the additional information to be transmitted.

In this way, in the second embodiment, additional information including both the first type of information and the second type of information is generated, even in the case where the data requested by the acquisition command is "additional information". If the requested data is "additional information", the second type of information is then deleted from the additional information before the additional information is transmitted. As a result, in the case where the requested data is "additional information", additional information that does not include the second type of information is transmitted to the moving apparatus 20, similarly to the first embodiment.

Note that, as an example of increasing the transmission frequency of additional information, a method of increasing the image capturing frequency as in step S405 is described, similarly to the first embodiment, but a state is also envisaged in which the frequency for generating live view images differs from the processing frequency required in order to generate additional information, and the frequency for generating additional information is higher. In such a case, a configuration may be adopted in which processing such as for increasing the transmission frequency of additional information is performed, rather than processing for increasing the image capturing frequency.

Third Embodiment

A third embodiment will be described, with reference to FIG. 6. In the third embodiment, the basic configurations of the image capturing apparatus 10 and the moving apparatus 20 are similar to the first embodiment. The following description will focus on the differences from the first embodiment.

Figure 6:
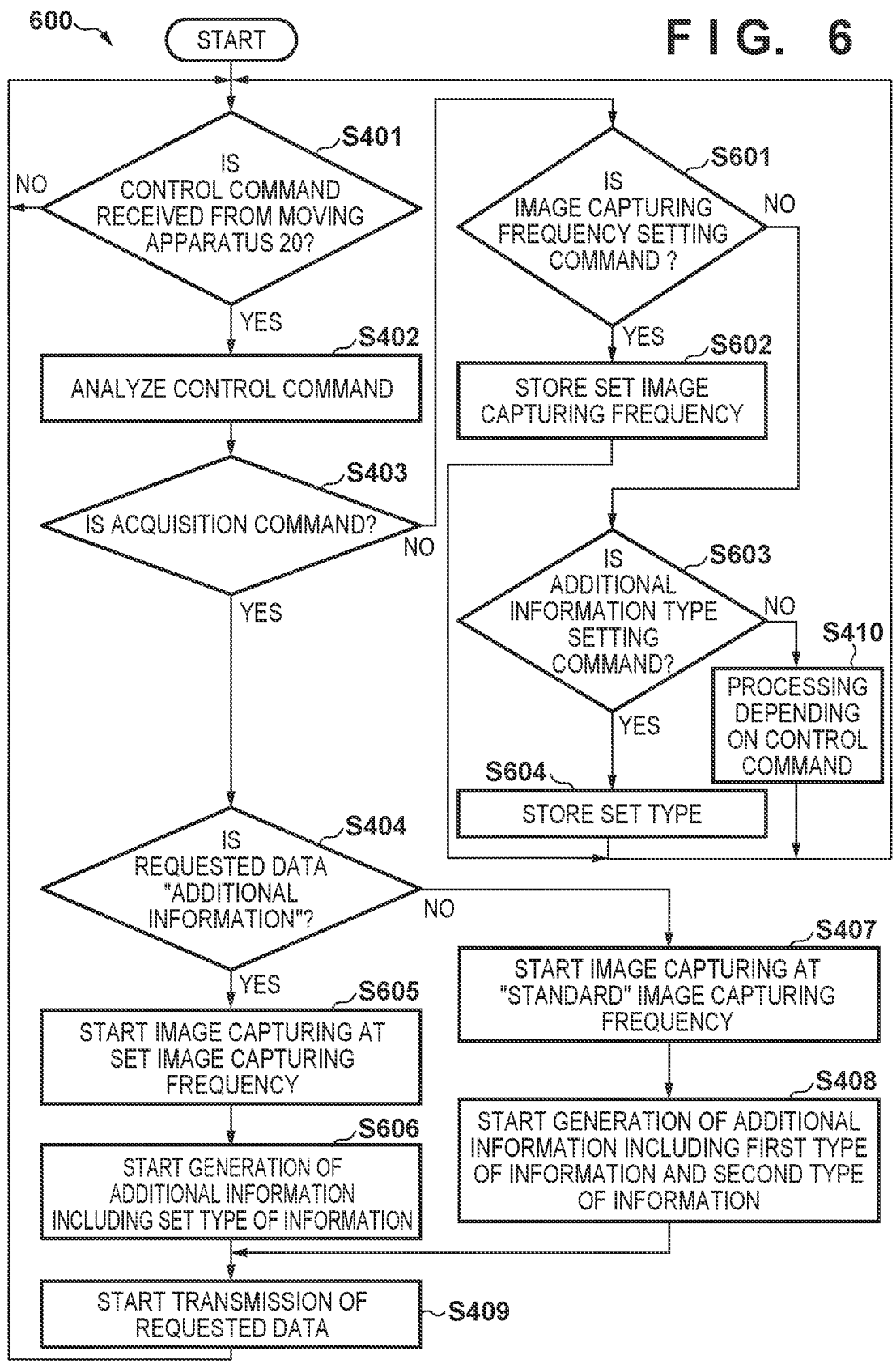
FIG. 6 is a flowchart for describing processing 600 that is performed by the image capturing apparatus 10 in the image capturing system of the third embodiment.

FIG. 6 is a flowchart for describing processing 600 that is performed by the image capturing apparatus 10 in the image capturing system of the third embodiment. As can be seen from FIG. 6, the processing 600 differs from the processing 400 in that steps S601 to S604 are added between steps S403 and S410, and steps S405 and S406 are respectively replaced by steps S605 and S606. The processing 600 starts when the image capturing apparatus 10 and the moving apparatus 20 are connected via the communication unit 107 and the communication unit 116.

If it is determined in step S403 that the control command received from the moving apparatus 20 is not an acquisition command, the microcomputer 103, in step S601, determines whether the control command is an image capturing frequency setting command. The image capturing frequency setting command is a command for setting the image capturing frequency of live view images in the setting (first setting) for when the data that is requested by the moving apparatus 20 is additional information. If the control command is an image capturing frequency setting command, the processing 600 proceeds to step S602, and, if this is not the case, the processing 600 proceeds to step S603.

In step S602, the microcomputer 103 sets the image capturing frequency (e.g., 120 fps) instructed by the image capturing frequency setting command as the image capturing frequency of live view images in the setting (first setting) for when the data that is requested by the moving apparatus 20 is additional information. The microcomputer 103 stores the set image capturing frequency in the volatile memory 104.

If the processing 600 proceeds from step S601 to step S603, the microcomputer 103 determines whether the control command is an additional information type setting command. The additional information type setting command is a command for setting the type of information to be included in the additional information that is generated in the setting (first setting) for when the data that is requested by the moving apparatus 20 is additional information. If the control command is an additional information type setting command, the processing 600 proceeds to step S604, and, if this is not the case, the processing 600 proceeds to step S410.

In step S604, the microcomputer 103 sets the type of information instructed by the additional information type setting command as the type of information to be included in the additional information that is generated in the setting (first setting) for when the data that is requested by the moving apparatus 20 is additional information. The microcomputer 103 stores the set type in the volatile memory 104.

For example, the moving apparatus 20 is able to set the first type of information described in the first embodiment with the additional information type setting command. Alternatively, the moving apparatus 20 may individually set the type of information. In this case, for example, the moving apparatus 20 is able to set the type of information as "size, position of frame indicating position of subject, in-focus/out-of-focus information".

On the other hand, if it is determined in step S403 that the control command received from the moving apparatus 20 is an acquisition command, and it is determined in step S404 that the requested data is "additional information", the processing 600 proceeds to step S605. In step S605, the microcomputer 103 starts control for repeatedly capturing live view images at the image capturing frequency (e.g., 120 fps) set by the processing (frequency setting processing) of step S602. In step S606, the microcomputer 103 starts generation of additional information including information of the type set by the processing (type setting processing) of step S604 (e.g., "size, position of frame indicating position of subject, in-focus/out-of-focus information"). It thereby becomes possible to capture live view images at the set image capturing frequency, and to generate additional information at a corresponding frequency. Also, it becomes possible to generate additional information including the set type of information.

Note that cases where the image capturing apparatus 10 does not support the image capturing frequency set in step S602 are conceivable. In such cases, the microcomputer 103 captures live view images at an image capturing frequency closest to the set image capturing frequency, among the image capturing frequencies supported by the image capturing apparatus 10, for example. Alternatively, if the image capturing apparatus 10 does not support the image capturing frequency instructed by the image capturing frequency setting command, the microcomputer 103 may return an error to the moving apparatus 20 in step S602.

In this way, in the third embodiment, the image capturing apparatus 10 sets the image capturing frequency of live view images in the setting (first setting) for when the data that is requested by the moving apparatus 20 is additional information, in accordance with the image capturing frequency setting command received from the moving apparatus 20. Also, the image capturing apparatus 10 sets the type of information to be included in the additional information that is generated in the setting (first setting) for when the data that is requested by the moving apparatus 20 is additional information, in accordance with the additional information type setting command received from the moving apparatus 20. Accordingly, with the third embodiment, it becomes possible to flexibly change the image capturing frequency of live view images, and also to flexibly change what kind of additional information is transmitted.

Fourth Embodiment

The various functions, processing or methods described in the aforementioned embodiments can also be realized by a personal computer, microcomputer, CPU (Central Processing Unit) or microprocessor executing a program. Hereinafter, in a fourth embodiment, the personal computer, microcomputer, CPU or microprocessor will be referred to as "computer X". In the fourth embodiment, a program for controlling the computer X, which is the program for realizing the various functions, processing or methods described in the aforementioned embodiments, will be referred to as "program Y".

The various functions, processing or methods described in the aforementioned embodiments are realized by the computer X executing the program Y. In this case, the program Y is supplied to the computer X via a computer-readable storage medium. The computer-readable storage medium in the fourth embodiment includes at least one of a hard disk drive, a magnetic storage device, an optical storage device, a magneto-optical storage device, a memory card, a volatile memory, a non-volatile memory and the like. The computer-readable storage medium in the fourth embodiment is a non-transitory storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-191439, filed Nov. 25, 2021, which is hereby incorporated by reference herein in its entirety.

What is claimed is:

1. An image capturing apparatus comprising at least one processor and/or at least one circuit which functions as:
   an image capturing unit configured to capture an image at an image capturing frequency that is determined based on a transmission setting which relates to a transmission of additional information and a captured image from the image capturing apparatus to a control device, wherein in a case where the transmission setting is a first setting, the image capturing frequency is higher than in a case where the transmission setting is a second setting or a third setting;
   a generation unit configured to generate the additional information associated with the captured image obtained by capturing an image at the image capturing frequency in the case where the transmission setting is the first setting or the third setting, the additional information being for use by the control device in control processing for controlling at least one of position and attitude of the image capturing apparatus; and
   a transmission unit configured to transmit the additional information to the control device in the case where the transmission setting is the first setting, to transmit the captured image to the control device in the case where the transmission setting is the second setting, and to transmit the additional information and the captured image to the control device in the case where the transmission setting is the third setting.

2. The image capturing apparatus according to claim 1, wherein the transmission setting is determined according to a request from the control device.

3. The image capturing apparatus according to claim 1, wherein, in the case where the transmission setting is the third setting, the generation unit generates the additional information so as to include a first type of information that is used by the control device in the control processing and a second type of information that is not used in the control processing, and
   in the case where the transmission setting is the first setting, the generation unit generates the additional information so as to include the first type of information and not include the second type of information.

4. The image capturing apparatus according to claim 1, wherein, in the case where the transmission setting is the first setting or the third setting, the generation unit generates the additional information so as to include a first type of information that is used by the control device in the control processing and a second type of information that is not used in the control processing, and
   the at least one processor and/or the at least one circuit further functions as a deletion unit configured to delete the second type of information from the additional information prior to transmission of the additional information, in the case where the transmission setting is the first setting.

5. The image capturing apparatus according to claim 1, wherein the at least one processor and/or the at least one circuit further functions as a type setting unit configured to set a type of information for the first setting, and
   wherein, in the case where the transmission setting is the first setting, the generation unit generates the additional information so as to include information of the type set by the type setting unit.

6. The image capturing apparatus according to claim 1, wherein the at least one processor and/or the at least one circuit further functions as a frequency setting unit configured to set an image capturing frequency for the first setting, and
   wherein, in the case where the transmission setting is the first setting, the image capturing unit captures an image at the image capturing frequency set by the frequency setting unit.

7. The image capturing apparatus according to claim 1, wherein the additional information includes information indicating position of a subject.

8. The image capturing apparatus according to claim 7, wherein the information indicating the position of the subject includes information indicating position and size of an autofocus (AF) frame.

9. The image capturing apparatus according to claim 1, wherein the additional information includes information indicating whether a subject is in focus.

10. The image capturing apparatus according to claim 1, wherein the control device is a moving apparatus configured to control the at least one of position and attitude of the image capturing apparatus mounted to the moving apparatus, according to a change in at least one of position and attitude of the moving apparatus.

11. The image capturing apparatus according to claim 10, wherein the additional information is for use by the moving apparatus to move to change the at least one of position and attitude of the moving apparatus so as to control the at least one of position and attitude of the image capturing apparatus mounted to the moving apparatus.

12. A control method for an image capturing apparatus, comprising:

capturing an image at an image capturing frequency that is determined based on a transmission setting which relates to transmission of additional information and a captured image from the image capturing apparatus to a control device, wherein in a case where the transmission setting is a first setting, the image capturing frequency is higher than in a case where the transmission setting is a second setting or a third setting;

generating the additional information associated with the captured image obtained by capturing an image at the image capturing frequency in the case where the transmission setting is the first setting or the third setting, the additional information being for use by the control device in control processing for controlling at least one of position and attitude of the image capturing apparatus; and transmitting the additional information to the control device in the case where the transmission setting is the first setting, transmitting the captured image to the control device in the case where the transmission setting is the second setting, and transmitting the additional information and the captured image to the control device in the case where the transmission setting is the third setting.

13. A non-transitory computer-readable storage medium which stores a program for causing a computer to execute a control method for an image capturing apparatus, the control method comprising:

capturing an image at an image capturing frequency that is determined based on a transmission setting which relates to a transmission of additional information and a captured image from the image capturing apparatus to a control device, wherein in a case where the transmission setting is a first setting, the image capturing frequency is higher than in a case where the transmission setting is a second setting or a third setting;

generating the additional information associated with the captured image obtained by capturing an image at the image capturing frequency in the case where the transmission setting is the first setting or the third setting, the additional information being for use by the control device in control processing for controlling at least one of position and attitude of the image capturing apparatus; and transmitting the additional information to the control device in the case where the transmission setting is the first setting, transmitting the captured image to the control device in the case where the transmission setting is the second setting, and transmitting the additional information and the captured image to the control device in the case where the transmission setting is the third setting.

* * * * *